United States Patent
Ou et al.

(10) Patent No.: US 11,174,842 B2
(45) Date of Patent: Nov. 16, 2021

(54) YAW CONTROL METHOD, DEVICE AND SYSTEM FOR WIND TURBINE

(71) Applicant: BEIJING GOLDWIND SCIENCE & CREATION WINDPOWER EQUIPMENT CO., LTD., Beijing (CN)

(72) Inventors: Fashun Ou, Beijing (CN); Fangchao Wang, Beijing (CN); Qiang Li, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 67 days.

(21) Appl. No.: 16/650,245

(22) PCT Filed: Aug. 1, 2018

(86) PCT No.: PCT/CN2018/097914
§ 371 (c)(1),
(2) Date: Mar. 24, 2020

(87) PCT Pub. No.: WO2019/184171
PCT Pub. Date: Oct. 3, 2019

(65) Prior Publication Data
US 2020/0271096 A1  Aug. 27, 2020

(30) Foreign Application Priority Data
Mar. 30, 2018  (CN) .......................... 201810279971.2

(51) Int. Cl.
F03D 7/04      (2006.01)
F03D 7/02      (2006.01)

(52) U.S. Cl.
CPC ........... *F03D 7/048* (2013.01); *F03D 7/0204* (2013.01)

(58) Field of Classification Search
CPC .............................. F03D 7/048; F03D 7/0204
See application file for complete search history.

(56) References Cited

U.S. PATENT DOCUMENTS

2010/0066087 A1   3/2010  Hayashi et al.
2014/0037447 A1   2/2014  Attia
(Continued)

FOREIGN PATENT DOCUMENTS

CN   101012809 A   8/2007
CN   104481804 A   4/2015
(Continued)

OTHER PUBLICATIONS

International Search Report dated Nov. 16, 2018; PCT/CN2018/097914.
(Continued)

*Primary Examiner* — Viet P Nguyen

(57) ABSTRACT

A yaw control method for a wind turbine, comprising the following steps: acquiring the current or future ambient wind speed and yaw angle of a wind turbine; estimating a power change value of the wind turbine caused by performing a yaw action on the basis of the yaw angle at the ambient wind speed; determining a yaw control strategy of the wind turbine according to the estimated power change value; transmitting a command to the wind turbine, so as to enable the wind turbine to perform the determined yaw control strategy. In addition, also provided are a device and system for performing the control method. The yaw control method, device and system can lower the loss of the wind turbine, (Continued)

reduce the overall load under certain extreme working conditions, and can also exploit the power generation potential of the wind turbine.

16 Claims, 3 Drawing Sheets

(56) References Cited

U.S. PATENT DOCUMENTS

| | | | |
|---|---|---|---|
| 2014/0203562 A1* | 7/2014 | Black | ............... F03D 7/0204 290/44 |
| 2017/0268484 A1 | 9/2017 | Li et al. | |
| 2018/0149136 A1 | 5/2018 | Jiang et al. | |
| 2018/0372070 A1 | 12/2018 | Vital Amuchastegui et al. | |

FOREIGN PATENT DOCUMENTS

| | | |
|---|---|---|
| CN | 104632521 A | 5/2015 |
| CN | 104853396 A | 5/2015 |
| CN | 105484938 A | 4/2016 |
| CN | 106704104 A | 5/2017 |
| EP | 2549098 A2 | 1/2013 |
| EP | 2674617 A3 | 12/2013 |
| EP | 3290689 A1 | 3/2018 |
| KR | 101778912 B1 | 9/2017 |
| WO | 2017/005945 A1 | 1/2017 |
| WO | 2017194067 A1 | 11/2017 |

OTHER PUBLICATIONS

First Australian Office Action dated Feb. 22, 2021; Appln. No. 2018416808.

Extended European Search Report dated Apr. 30, 2021; Appln. No. 18912908.3.

The First Indian office action dated Jan. 5, 2021; Application 202017011033.

First Chinese Office Action dated Mar. 3, 2020; Application No. 201810279971.2.

* cited by examiner

YAW CONTROL METHOD, DEVICE AND SYSTEM FOR WIND TURBINE

This application is the national phase of International Application No. PCT/CN2018/097914, titled "YAW CONTROL METHOD, DEVICE AND SYSTEM FOR WIND TURBINE", filed on Aug. 1, 2018, which claims priority to Chinese Patent Application No. 201810279971.2, titled "METHOD, DEVICE, AND SYSTEM FOR CONTROLLING YAW OF WIND TURBINE", filed on Mar. 30, 2018 with the China National Intellectual Property Administration, which is incorporated herein by reference in its entirety.

FIELD

The present disclosure relates generally to the technical field of wind power generation, and in particular, to a method, a device and a system for controlling yaw of a wind turbine.

BACKGROUND

Currently, a large wind turbine is generally an upwind-oriented wind turbine, which is provided with an automatic yaw system. A wind direction is usually detected in real time by a wind-direction detection sensor (for example, a wind vane), and a deviation angle of wind alignment of the wind turbine is acquired. In a case that the deviation angle of wind alignment is greater than a preset threshold for yawing, a start instruction for rotating clockwise or counterclockwise is sent to a yaw motor. The yaw motor rotates based on the start instruction, and outputs a yaw moment for a low rotational speed and a high torque via a yaw speed reducer to drive a yaw bearing. Thereby, a yawing operation for wind alignment of the wind turbine is implemented. During yawing, the deviation angle of wind alignment of the wind turbine is acquired in real time. In a case that the deviation angle of wind alignment is less than a threshold, the yawing operation for wind alignment is stopped.

SUMMARY

In an aspect, a method for controlling yaw of a wind turbine is provided according to an embodiment of the present disclosure. The method for controlling yaw includes: acquiring an ambient wind speed and a deviation angle of wind alignment, of the wind turbine, where the ambient wind speed and the deviation angle of wind alignment are a current ambient wind speed and a current deviation angle of wind alignment, or a future ambient wind speed and a future deviation angle of wind alignment; estimating a power variation caused by a yawing operation for wind alignment, where the yawing operation for wind alignment is performed by the wind turbine based on the deviation angle of wind alignment under the ambient wind speed; determining a yaw control strategy for the wind turbine based on the estimated power variation; and sending an instruction to the wind turbine to make the wind turbine execute the determined yaw control strategy.

In another aspect, a device for controlling yaw of a wind turbine is provided according to an embodiment of the present disclosure. The device for controlling yaw includes a data acquiring module, an estimating module, a strategy determining module, and a sending module. The data acquiring module is configured to acquire an ambient wind speed and a deviation angle of wind alignment, of the wind turbine, where the ambient wind speed and the deviation angle of wind alignment are a current ambient wind speed and a current deviation angle of wind alignment, or a future ambient wind speed and a future deviation angle of wind alignment. The estimating module is configured to estimate a power variation caused by a yawing operation for wind alignment, where the yawing operation for wind alignment is performed by the wind turbine based on the deviation angle of wind alignment under the ambient wind speed. The strategy determining module is configured to determine a yaw control strategy for the wind turbine based on the estimated power variation. The sending module is configured to send an instruction to the wind turbine to make the wind turbine execute the determined yaw control strategy.

In another aspect, a computer readable storage medium storing a computer program is provided according to an embodiment of the present disclosure. The computer program when executed by a processor implements the aforementioned method for controlling yaw of the wind turbine.

In another aspect, a device for controlling yaw of a wind turbine is provided according to an embodiment of the present disclosure. The device for controlling yaw includes a processor and a memory. The memory stores a computer program. The computer program when executed by the processor implements the aforementioned method for controlling yaw of the wind turbine.

In another aspect, a system for controlling yaw of a wind turbine is provided according to the present disclosure. The system for controlling yaw includes multiple wind turbines and a field-group control device. The field-group control device is configured to perform the aforementioned method for controlling yaw of the wind turbine, to make at least one of the multiple wind turbines perform the corresponding yaw control strategy.

DETAILED DESCRIPTION OF EMBODIMENTS

Figure 1:
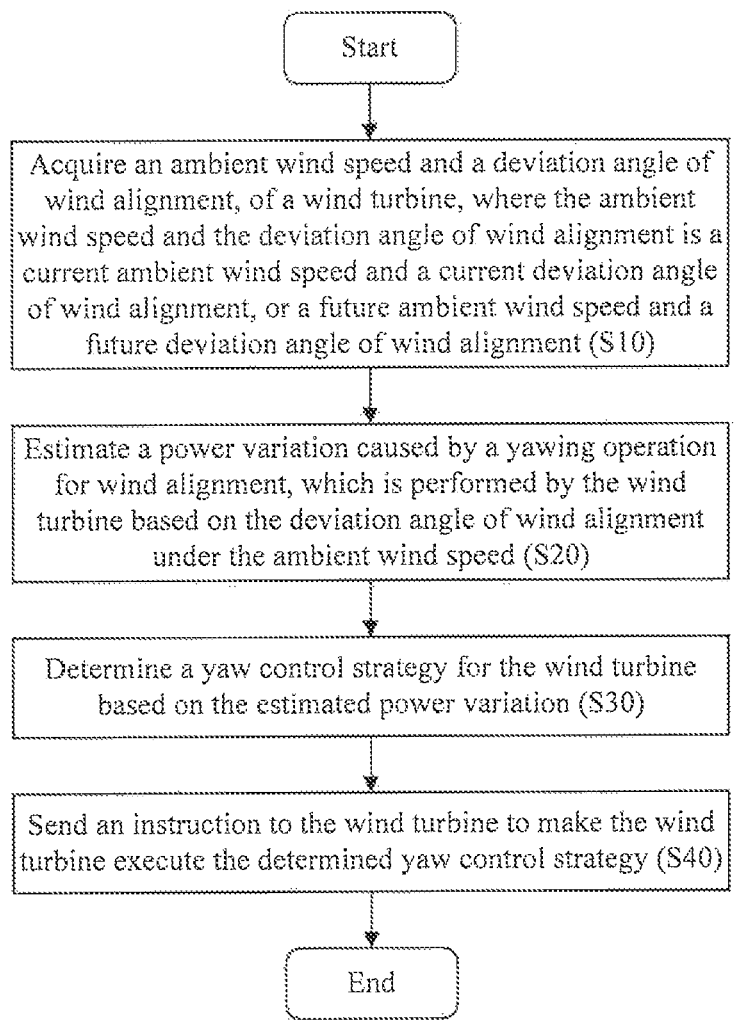
FIG. 1 is a flowchart of a method for controlling yaw of a wind turbine according to an embodiment of the present disclosure.

FIG. 1 is a flowchart of a method for controlling yaw of a wind turbine according to an embodiment of the present disclosure.

Reference is made to FIG. 1. In step S10, an ambient wind speed and a deviation angle of wind alignment of the wind turbine are acquired, where the ambient wind speed and the deviation angle of wind alignment is a current ambient wind speed and a current deviation angle of wind alignment, or a future ambient wind speed and a future deviation angle of wind alignment.

In an embodiment, the current ambient wind speed and the current deviation angle of wind alignment of the wind turbine that are detected may be acquired in step S10. For example, the ambient wind speed of the wind turbine and the deviation angle of wind alignment of the wind turbine that are detected at a current moment may be acquired. Alternatively, a mean of ambient wind speeds of the wind turbine and a mean of deviation angle of wind alignments of the wind turbine that are detected in a current period (for example, 1 second) may be acquired.

In another example, the future ambient wind speed and the future deviation angle of wind alignment of the wind turbine that are predicted may be acquired in step S10. For example, the ambient wind speed of the wind turbine after a period (for example, 7 seconds) and the deviation angle of wind alignment of the wind turbine after the period may be acquired. Alternatively, a mean of ambient wind speeds of the wind turbine and a mean of deviation angles of wind alignment of the wind turbine within a future period may be acquired.

In an embodiment, first operation data of the wind turbine may be inputted into a wind speed prediction model corresponding to the wind turbine, to predict the future ambient wind speed through the wind speed prediction model. Second operation data of the wind turbine may be inputted into a wind-alignment deviation-angle prediction model corresponding to the wind turbine, to predict a future deviation angle of wind alignment through the wind-alignment deviation-angle prediction model. The first operation data includes at least an ambient wind speed. The second operation data includes at least a deviation angle of wind alignment.

In an embodiment, the first operation data of the wind turbine, at each sampling moment within a first preset period ending at a current moment, may be inputted into the wind speed prediction model corresponding to the wind turbine, so as to acquire an ambient wind speed of the wind turbine after a second preset period through the wind speed prediction model. The second operation data of the wind turbine, at each sampling moment within the first preset period ending at the current moment, may be inputted into the wind-alignment deviation-angle prediction model corresponding to the wind turbine, so as to acquire a deviation angle of wind alignment of the wind turbine after the second preset period through the wind-alignment deviation-angle prediction model.

The first operation data (that is, the first operation data based on a temporal sequence) of the wind turbine collected with a certain sampling period (for example, 20 milliseconds, 1 second, or 7 seconds) may serve a training set, to train the wind speed prediction model corresponding to the wind turbine. The future ambient wind speed of the wind turbine is predicable by using the trained wind speed prediction model.

The second operation data (that is, the second operation data based on a temporal sequence) of the wind turbine collected with a certain sampling period (for example, 20 milliseconds, 1 second, or 7 seconds) may serve a training set, to train the wind-alignment deviation-angle model corresponding to the wind turbine. The future deviation angle of wind alignment of the wind turbine is predicable by using the trained wind-alignment deviation-angle prediction model.

In an embodiment, a length of the second preset period may be relevant to the sampling period of training samples. Shorter the sampling period of the training samples is, shorter the second preset period is. In an embodiment, the length of the second preset period may be equal to that of the sampling period of the training samples. In an embodiment, in a case that the wind speed prediction model corresponding to the wind turbine is trained with training samples of which the sampling period is 7 seconds, an ambient wind speed of the wind turbine after 7 seconds is predicable by using the wind speed prediction model.

The first operation data and the second operation data each may be a wind parameter during operation of the wind turbine, and/or an operation parameter of the wind turbine. In an embodiment, the first operation data further includes, besides the ambient wind speed, at least one of: a deviation angle of wind alignment, a rotation speed of a power generator, a torque of a power generator, an output power, an acceleration of a nacelle along an X-axis and/or a Y-axis, a pitch angle of a blade, or a position of a nacelle. In an embodiment, the second operation data further includes, besides the deviation angle of wind alignment, at least one of: an ambient wind speed, a rotation speed of a power generator, a torque of a power generator, an output power, an acceleration of a nacelle along an X-axis and/or a Y-axis, a pitch angle of a blade, or a position of a nacelle. It should be understood that the first operation data and the second operation data may be identical.

It should be further understood that the wind speed prediction model (or the wind-alignment deviation-angle prediction model) corresponding to the wind turbine may further predict, besides the ambient wind speed (or the deviation angle of wind alignment) in a short period, ambient wind speeds (or deviation angles of wind alignment) at moments interleaved by a preset interval within a long period in the future. For example, the wind speed prediction model (or the wind-alignment deviation-angle prediction model) corresponding to the wind turbine may predict ambient wind speeds (or deviation angles of wind alignment) at moments interleaved by an interval of 7 seconds within future 5 minutes, for example, predict the ambient wind speeds (or deviation angles of wind alignment) after 7 seconds, 14 seconds, 21 seconds, . . . , and 5 minutes.

In an embodiment, the wind speed prediction model and the wind-alignment deviation-angle prediction model corresponding to the wind turbine may be trained online. The wind speed prediction model may be trained in real time by directly using currently collected first operation data of the wind turbine. The wind-alignment deviation-angle prediction model may be trained in real time by directly using currently collected second operation data of the wind turbine.

In another example, the wind speed prediction model and the wind-alignment deviation-angle prediction model corresponding to the wind turbine may be trained offline. The wind speed prediction model may be trained once based on first operation data of the wind turbine acquired within a previous period. The wind-alignment deviation-angle prediction model may be trained once based on second operation data of the wind turbine acquired within a previous period.

In an embodiment, in the step S10, the predicted future ambient wind speed and the predicted future deviation angle of wind alignment of the wind turbine may be acquired, in a case that it is determined that prediction accuracy of the wind speed prediction model and prediction accuracy of the wind-alignment deviation-angle prediction model meet a preset condition. The detected current ambient wind speed and the detected current deviation angle of wind alignment of the wind turbine may be acquired, in a case that it is determined that the prediction accuracy of the wind speed prediction model and the prediction accuracy of the wind-alignment deviation-angle prediction model does not meet the preset condition.

The prediction accuracy of the wind speed prediction model may be determined based on deviations between ambient wind speeds acquired through the wind speed prediction model for some moments (which serve as test samples) and ambient wind speeds actually detected at such moments. The prediction accuracy of the wind-alignment deviation-angle prediction model may be determined based on deviations between deviation angles of wind alignment acquired through the wind-alignment deviation-angle prediction model for some moment and deviation angles of wind alignment actually detected at such moments. In an embodiment, each sampling moment within a period ending at the current moment may serve as the test samples.

The prediction accuracy of the wind speed prediction model and the prediction accuracy of the wind-alignment deviation-angle prediction model may be scaled in various appropriate manners. In an embodiment, the prediction accuracy of the wind speed prediction model and the prediction accuracy of the wind-alignment deviation-angle prediction model may be scaled based on a mean absolute error (MAE), a mean absolute error percentage (MAPE), a standard deviation of a mean absolute error (SDMAE), a standard deviation of a mean absolute error percentage (SDMAPE), or the like.

In an embodiment, an MAE of the wind speed prediction model may be calculated from the following formula (1).

$$MAE = \frac{1}{n}\sum_{i=1}^{n}|\hat{x}_i - x_i| \quad (1)$$

In formula (1), $x_i$ represents a wind speed detected at an i-th test sample, $\hat{x}_i$ represents a wind speed predicted at the i-th test sample through the wind speed prediction model, and $1 \leq i \leq n$, where n is a quantity of test samples included in a test set.

In an embodiment, an MAPE of the wind-alignment deviation-angle prediction model may be calculated from the following formula (2).

$$MAPE = \frac{1}{m}\sum_{j=1}^{m}\left(\left|\frac{\hat{y}_j - y_j}{y_j}\right|\right) \times 100\% \quad (2)$$

In formula (2), $y_j$ represents a deviation angle of wind alignment detected at a j-th test sample, $\hat{y}_j$ represents a deviation angle of wind alignment predicted at the j-th test sample through the wind-alignment deviation-angle prediction model, and $1 \leq j \leq m$, where m is a quantity of test samples included in a test set.

In an embodiment, in a case that the prediction accuracy of the wind speed prediction model is greater than a first preset threshold and the prediction accuracy of the wind-alignment deviation-angle prediction model is greater than a second preset threshold, it is determined that the prediction accuracy of the wind speed prediction model and the prediction accuracy of the wind-alignment deviation-angle prediction model meet the preset condition.

In another embodiment, in a case that a weighting result of the prediction accuracy of the wind speed prediction model and the prediction accuracy of the wind-alignment deviation-angle prediction model is greater than a third preset threshold, it is determined that the prediction accuracy of the wind speed prediction model and the prediction accuracy of the wind-alignment deviation-angle prediction model meet the preset condition. For example, a weighting result $P_{all}$ of the prediction accuracy of the wind speed prediction model and the prediction accuracy of the wind-alignment deviation-angle prediction model may be calculated from the following formula (3).

$$P_{all} = w_1 * p(f(x_1)) + w_2 * p(f(x_2)) \quad (3)$$

In formula (3), $p(f(x_1))$ represents prediction accuracy of a wind speed prediction model $f(x_1)$ (for example, $p(f(x_1))$ may be an MAE of the wind speed prediction model), $p(f(x_2))$ represents an prediction accuracy of a wind-alignment deviation-angle prediction model $f(x_2)$ (for example, $p(f(x_2))$ may be an MAE of the wind-alignment deviation-angle prediction model), $w_1$ represents a weight corresponding to the wind speed prediction model $f(x_1)$), $w_2$ represents a weight corresponding to the wind-alignment deviation-angle prediction model $f(x_2)$, and $w_1 + w_2 = 1$.

In addition, it should be understood that in the case that it is determined that the prediction accuracy of the wind speed prediction model and the prediction accuracy of the wind-alignment deviation-angle prediction model does not meet the preset condition, the wind speed prediction model and wind-alignment deviation-angle prediction model may be further optimized and/or trained until it is determined that the prediction accuracy of the wind speed prediction model and the prediction accuracy of the wind-alignment deviation-angle prediction model meet the preset condition.

In step S20, a power variation caused by a yawing operation for wind alignment is estimated, where the yawing operation for wind alignment is performed by the wind turbine based on the deviation angle of wind alignment under the ambient wind speed.

In an embodiment, an output power increment and/or a power loss caused by the yawing operation for wind alignment is estimated, where the yawing operation for wind alignment is performed by the wind turbine based on the deviation angle of wind alignment under the ambient wind speed.

An output power increment $\Delta P(v)$ caused by the yawing operation for wind alignment may be estimated in various appropriate manners, where the yawing operation for wind alignment is performed based on a deviation angle β of wind alignment under an ambient wind speed v, and makes the wind turbine aligned with a wind.

In an embodiment, the output power increment $\Delta P(v)$ may be calculated from the following formula (4).

$$\Delta P(v) = P_e(v) * (1 - (\cos \beta)^2) \quad (4)$$

In formula (4), $P_e(v)$ represents a designed (or rated) output power of the wind turbine under the ambient wind speed v, in a standard condition.

In another embodiment, it may be determined whether the wind turbine is in a full-power generating state (that is, operating with a constant power) under the ambient wind speed v. In a case that the wind turbine is in the full-power generating state, it is determined that the output power increment $\Delta P(v)$ caused by the yawing operation for wind alignment is small, where the yawing operation for wind alignment is performed based on the deviation angle β of wind alignment under the ambient wind speed v, and makes the wind turbine aligned with a wind. In an embodiment, it may be determined that the wind turbine is at the full-power generating state under the ambient wind speed v in case of $P(v) \geq P_e(v) + P_{const1}$, where P(v) represents an output power of the wind turbine under the ambient wind speed v, and $P_{const1}$ represents a preset margin. In an embodiment, P(v) may be an output power that is currently detected, in a case that the current ambient wind speed and the current deviation angle of wind alignment are acquired in the step S10. P(v) may be acquired based on the acquired ambient wind speed v and an operation power curve of the wind turbine, in a case that the future ambient wind speed and the future deviation angle of wind alignment are acquired in the step S10.

A power loss $P_{loss}$ caused by the yawing operation for wind alignment may be estimated in various appropriate manners, where the yawing operation for wind alignment is performed based on a deviation angle β of wind alignment under an ambient wind speed v, and makes the wind turbine aligned with a wind. In an embodiment, the power loss Floss may be briefly estimated from the following formula (5).

$$P_{loss}=n*P'_e*\delta+P_{const2} \quad (5)$$

In formula (5), n is a quantity of yaw motors in the wind turbine, $P'_e$ represents a rated power of each yaw motor, $P_{cont2}$ represents a power loss margin for calculating the power loss $P_{loss}$, and δ is a loss coefficient ranging from 0 to 1. In an embodiment, δ ranges from 0 to 0.3. In an embodiment, the loss coefficient δ may be set based on how long the wind turbine is at a yawing state in each hour.

In step S30, a yaw control strategy is determined for the wind turbine based on the estimated power variation.

In an embodiment, a yaw-control parameter in the yaw control strategy may be determined for the wind turbine, based on the estimated power variation.

In an embodiment, a time delay constant for yawing and/or a time coefficient for calculating a mean deviation angle of wind alignment are determined for controlling yaw of the wind turbine, based on the estimated output power increment and/or the estimated power loss. In other words, the time delay constant for yawing and/or the time coefficient for calculating the mean deviation angle of wind alignment are determined in the yaw control strategy for the wind turbine, based on the estimated output power increment and/or the estimated power loss.

The time coefficient for calculating a mean deviation angle of wind alignment represents a length of a period, within which deviation angles of wind alignment for calculating the mean deviation angle of wind alignment are acquired. The mean deviation angle of wind alignment may be acquired by averaging deviation angles of wind alignment in the period (for example, 30 seconds or 60 seconds), so as to determine whether yawing is necessary based on the mean deviation angle of wind alignment. In one embodiment, it is determined that the yawing is necessary, in a case that the mean deviation angle of wind alignment is greater than a preset threshold for yawing.

The time delay constant for yawing represents a time difference between a moment at which it is determined that the yawing operation for wind alignment is to be performed and a moment at which the yawing operation for wind alignment is actually started. In an embodiment, the time delay constant for yawing may be a parameter of a delay turned-on switch in a programmable logic controller (PLC) for yaw control. In case of a yaw condition being met (that is, determining that the yawing operation for wind alignment is to be performed), the yawing operation for wind alignment is not performed until being delayed for a period (equal to the time delay constant for yawing) by the delay turned-on switch.

It should be understood that the larger the time coefficient for calculating the mean deviation angle of wind alignment is, the less the yawing operations are. The larger the time delay constant for yawing is, the less the yawing operations are.

In an embodiment, the yaw control strategy for the wind turbine may be determined as one of a first mode, a second mode, and a third mode, based on the estimated output power increment and/or the estimated power loss. In the first mode, the time coefficient for calculating the mean deviation angle of wind alignment is equal to a first preset value, and/or the time delay constant for yawing is equal to a second preset value. In the second mode, the time coefficient for calculating the mean deviation angle of wind alignment is equal to a third preset value, and/or the time delay constant for yawing is equal to a fourth preset value. In the third mode, the time coefficient for calculating the mean deviation angle of wind alignment is equal to a fifth preset value, and/or the time delay constant for yawing is equal to a sixth preset value. The first preset value is greater than the fifth preset value, and the fifth preset value is greater than the third preset value. And/or, the second preset value is greater than the sixth preset value, and the sixth preset value is greater than the fourth preset value.

In a low-wind-speed range (for example, a wind speed ranges from 3 m/s to 5 m/s), the output power of the wind turbine is small, and a wind direction and a wind speed change greatly. Based on a conventional yaw control strategy, the wind turbine may yaw frequently, and an increment in power generation caused by a yawing operation for wind alignment that make the wind turbine aligned with a wind may be less than a power consumed by the yawing operation itself. Therefore, in the low-wind-speed range, times of yaw may be reduced by increasing the time delay constant for yawing and/or the time coefficient for calculating the mean deviation angle of wind alignment, so as to avoid an additional power loss. In an embodiment, the yaw control strategy for the wind turbine may be determined as the first mode in case of $\Delta P(v) \leq P_{loss}$.

In a transition range of an operation power curve of the wind turbine (that is, when a power generator operates at a rated rotational speed but does not output a rated output power), the yawing operation for wind alignment significantly affects the output power of the wind turbine. For a same deviation angle of wind alignments, an increment in power generation caused by yawing for wind alignment is much greater in the transition range than in the low-wind-speed range. Further, in the transition range, the increment in power generation caused by the yawing operation for wind alignment that makes the wind turbine aligned with the wind is greater than power consumed by the yawing operation for wind alignment itself. Therefore, in the transition range, times of yaw may be increased by decreasing the time delay constant for yawing and/or the time coefficient for calculating the mean wind alignment deviation angle. Thereby, the wind turbine is more sensitive to the deviation angle of wind alignment, and a power generation potential of the wind turbine is tapped as much as possible. In an embodiment, the yaw control strategy for the wind turbine may be determined as the second mode in case of $P_{loss} < \Delta P(v) \leq P_e(v)$.

In a high-wind-speed range (for example, a range of a wind speed greater than a rated wind speed for the wind turbine), the wind direction and the wind speed change slightly, and the wind turbine outputs the rated output power through pitch variation (that is, the wind turbine is in the full-power generating state and operates in a control mode with a constant power). Under an extreme condition in such case, for example, an abrupt change in the wind direction under an abrupt increase in the wind speed, the wind turbine may frequently yaw based on a conventional yaw control strategy, resulting in an increased power loss of the wind turbine while the output power of the wind turbine remains constant. Namely, the frequent yaw cannot lead to an increment in power generation of the wind turbine. In addition, the wind direction may change during yawing, and thereby the yaw motor may not be capable to overcome an additional thrust applied on an impeller plane due to the abrupt change in the wind direction. Hence, the yaw motor may be overloaded and report a failure, and a yaw load of the wind turbine may increase. Therefore, in the high-wind-speed range, times of yaw may be reduced by increasing the time delay constant for yawing and/or the time coefficient for calculating the mean wind alignment deviation angle. In an embodiment, the yaw control strategy for the wind turbine may be determined as the third mode in case of $P(v) \geq P_e(v) + P_{const1}$.

In step S40, an instruction is sent to the wind turbine to make the wind turbine execute the determined yaw control strategy. The instruction may include a yaw-control parameter corresponding to the determined yaw control strategy. For example, the instruction may include a time delay constant for yawing and/or a time coefficient for calculating a mean deviation angle of wind alignment that correspond to the determined yaw control strategy.

According to embodiments of the present disclosure, a change pattern of the wind direction in various wind speed ranges is fully considered, and a power gain or loss caused by the wind turbine yawing for wind alignment under the various wind speed ranges (that is, various operation conditions) is fully considered, in order to determine the yaw control strategy. Not only the power loss of the wind turbine and an overall load in some extreme operation conditions are reduced, but also the power generation potential of the wind turbine is tapped.

A conventional yaw system is a follow-up system with a large time lag and a large inertia. Generally, one yawing operation for wind alignment cost at least several seconds to several minutes. Since the wind direction always changes, the conventional yaw system cannot track the wind direction in real time and keep the wind turbine aligned with the wind all the time. In some special operation conditions such as an abrupt change in the wind direction under a high wind speed, the load on the wind turbine is increased in a case that the wind turbine fails to timely yaw for aligning with the wind.

According to embodiments of the present disclosure, in a case that the predicted future ambient wind speed and the predicted future deviation angle of wind alignment are acquired in the step S10, the wind turbine may execute a predetermined yaw control strategy in the step S40. The yaw control is performed on the wind turbine in advance, based on the predicted future deviation angle of wind alignment, so that the wind turbine can be aligned with the wind more accurately. Thereby, power generation of the wind turbine is increased, and a load on the wind turbine under the abrupt change in the wind direction is reduced. In an embodiment, in a case that the predicted deviation angle of wind alignment at a future moment is greater than a preset threshold for yawing, a time period cost by the yawing operation for wind alignment may be calculated based on a yawing rate of the wind turbine, where the yawing operation is performed based on the deviation angle of wind alignment at the future moment. Further, a moment of starting yawing may be determined based on the time period and the future moment, and then the yawing is started at the determined moment. Thereby, the wind turbine is aligned with the wind at the future moment.

According to embodiments of the present disclosure, the yaw control is changed to be active control rather than passive control. Thereby, the wind turbine can be aligned with the wind more accurately, the power generation of the wind turbine is increased, and the load on the wind turbine under the abrupt change in the wind direction is reduced.

Figure 2:
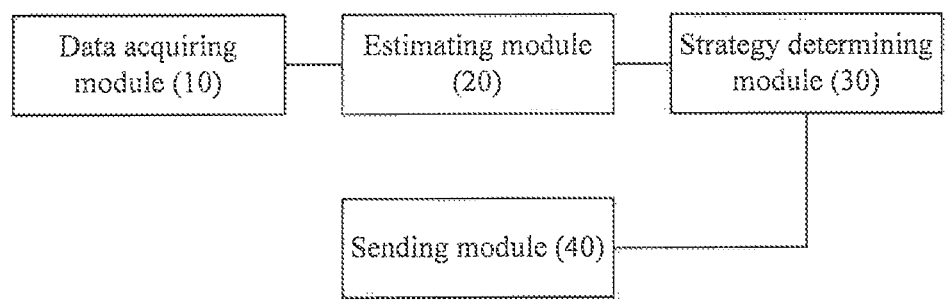
FIG. 2 is a block diagram of a device for controlling yaw of a wind turbine according to an embodiment of the present disclosure.

FIG. 2 is a block diagram of a device for controlling yaw of a wind turbine according to an embodiment of the present disclosure. Referring to FIG. 2, the device for controlling yaw of a wind turbine according to an embodiment of the present disclosure includes a data acquiring module 10, an estimating module 20, a strategy determining module 30, and a sending module 40.

The data acquiring module 10 is configured to acquire an ambient wind speed and a deviation angle of wind alignment, of the wind turbine, where the ambient wind speed and the deviation angle of wind alignment are a current ambient wind speed and a current deviation angle of wind alignment, or a future ambient wind speed and a future deviation angle of wind alignment.

In an embodiment, the data acquiring module 10 may acquire the current ambient wind speed of the wind turbine and the current deviation angle of wind alignment of the wind turbine that are detected.

In another embodiment, the data acquiring module 10 may acquire the future ambient wind speed of the wind turbine and the future deviation angle of wind alignment of the wind turbine that are predicted.

In an embodiment, the data acquiring module 10 may input first operation data of the wind turbine into a wind speed prediction model corresponding to the wind turbine, to predict the future ambient wind speed through the wind speed prediction model. The first operation data includes at least an ambient wind speed. The data acquiring module 10 may input second operation data of the wind turbine into a wind-alignment deviation-angle prediction model corresponding to the wind turbine, to estimate the future deviation angle of wind alignment through the wind-alignment deviation-angle prediction model. The second operation data includes at least a deviation angle of wind alignment.

In an embodiment, the first operation data further includes, besides the ambient wind speed, at least one of a deviation angle of wind alignment, a rotation speed of a power generator, a torque of a power generator, an output power, an acceleration of a nacelle, a pitch angle of a blade, of a position of a nacelle.

In an embodiment, the second operation data further includes, besides the deviation angle of wind alignment, at least one of an ambient wind speed, a rotation speed of a power generator, a torque of a power generator, an output power, an acceleration of a nacelle, a pitch angle of a blade, and a position of a nacelle.

In an embodiment, the data acquiring module 10 may acquire the predicted future ambient wind speed and the predicted future deviation angle of wind alignment of the wind turbine, in a case that it is determined that prediction accuracy of the wind speed prediction model and prediction accuracy of the wind-alignment deviation-angle prediction model meet a preset condition. The data acquiring module 10 may acquire the detected current ambient wind speed and the detected current deviation angle of wind alignment of the wind turbine, in a cased that it is determined that the prediction accuracy of the wind speed prediction model and the prediction accuracy of the wind-alignment deviation-angle prediction model does not meet the preset condition.

The estimating module 20 is configured to estimate a power variation caused by a yawing operation for wind alignment, which is performed by the wind turbine based on the deviation angle of wind alignment under the ambient wind speed.

In an embodiment, the estimating module 20 may estimate an output power increment and/or a power loss caused by the yawing operation for wind alignment, which is performed by the wind turbine based on the deviation angle of wind alignment under the ambient wind speed.

The strategy determining module 30 is configured to determine a yaw control strategy for the wind turbine based on the estimated power variation.

In an embodiment, the strategy determining module 30 may determine a time delay constant for yawing and/or a time coefficient for calculating a mean deviation angle of wind alignment, for controlling yaw of the wind turbine, based on the estimated output power increment and/or the estimated power loss. The time coefficient for calculating a mean deviation angle of wind alignment represents a length of a period, within which deviation angles of wind alignment for calculating the mean deviation angle of wind alignment are acquired. The time delay constant for yawing represents a time difference between a moment at which it is determined that the yawing operation for wind alignment is to be performed and a moment at which the yawing operation for wind alignment is actually started.

In an embodiment, the strategy determining module 30 may determine, based on the estimated output power increment and/or the estimated power loss, the yaw control strategy for the wind turbine as one of a first mode, a second mode, and a third mode. In the first mode, the time coefficient for calculating the mean deviation angle of wind alignment is equal to a first preset value, and/or the time delay constant for yawing is equal to a second preset value. In the second mode, the time coefficient for calculating the mean deviation angle of wind alignment is equal to a third preset value, and/or the time delay constant for yawing is equal to a fourth preset value. In the third mode, the time coefficient for calculating the mean deviation angle of wind alignment is equal to a fifth preset value, and/or the time delay constant for yawing is equal to a sixth preset value. The first preset value is greater than the fifth preset value, and the fifth preset value is greater than the third preset value. And/or, the second preset value is greater than the sixth preset value, and the sixth preset value is greater than the fourth preset value.

In an embodiment, the strategy determining module 30 may determine the yaw control strategy for the wind turbine as the first mode in case of $\Delta P(v) \leq P_{loss}$.

In another embodiment, the strategy determining module 30 may determine the yaw control strategy for the wind turbine as the second mode in case of $P_{loss} < \Delta P(v) \leq P_e(v)$.

In another embodiment, the strategy determining module 30 may determine the yaw control strategy for the wind turbine as the third mode in case of $P(v) \geq P_e(v) + P_{const1}$.

$\Delta P(v)$ represents an output power increment caused by performing the yawing operation for wind alignment, $P_{loss}$ represents a power loss caused by performing the yawing operation for wind alignment, $P(v)$ represents an output power of the wind turbine under the acquired ambient wind speed, $P_e(v)$ represents a designed output power of the wind turbine under the acquired ambient wind speed in a standard condition, and $P_{const1}$ represents a preset margin.

The sending module 40 is configured to send an instruction to the wind turbine to make the wind turbine execute the determined yaw control strategy.

It should be understood that the device for controlling yaw of the wind turbine according to embodiments of the present disclosure may be implemented with reference to the relevant embodiments described in conjunction with FIG. 1, and thereby is not described in detail herein.

Figure 3:
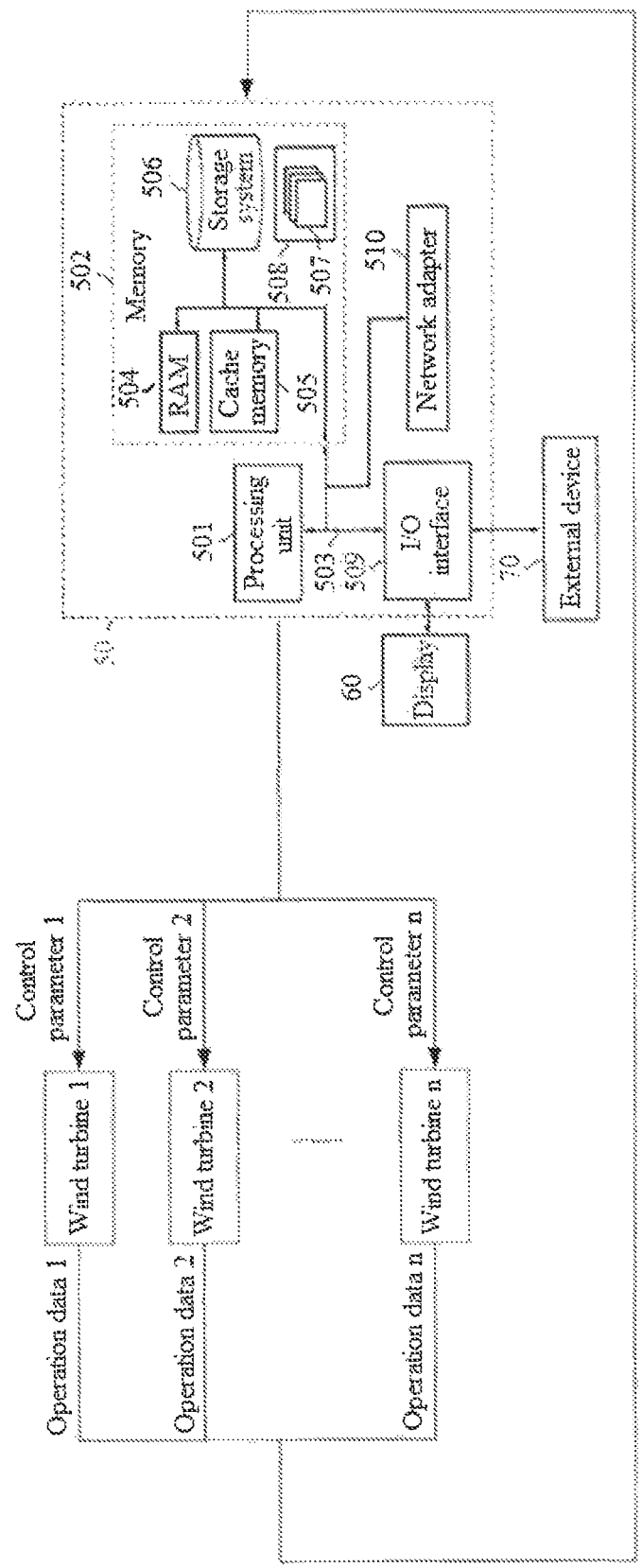
FIG. 3 is a block diagram of a system for controlling yaw of a wind turbine according to an embodiment of the present disclosure.

FIG. 3 is a schematic diagram of a system for controlling yaw of a wind turbine according to an embodiment of the present disclosure.

Referring to FIG. 3, the system for controlling yaw of a wind turbine includes multiple wind turbines (namely, wind turbine 1, wind turbine 2, . . . , and wind turbine n) and a field-group control device 50. In an embodiment of the present disclosure, a component of the field-group control device 50 may include but is not limited to: one or more processors or processing units 501, a system memory 502, and a bus 503 configured to connect system components (including the system memory 502 and the processing unit 501).

The bus 503 is embodied as one or more of multiple bus structures. For example, the bus structures may include but are not limited to: an industrial standard architecture (ISA) bus, a micro channel architecture (MAC) bus, an enhanced ISA bus, a video electronics standards association (VESA) local bus, and a peripheral component interconnect (PCI) bus.

In another embodiment of the present disclosure, the field-group control device 50 may further include one or more computer-system readable media. The media may be any available media accessible for the field-group control device 50, and may include a volatile medium, a non-volatile medium, a removable medium, or a non-removable medium.

The system memory 502 may include a computer-system readable medium in a form of a volatile memory, for example, a random access memory (RAM) 504 and/or a cache memory 505. The system memory 502 may further include other removable (or non-removable), or volatile (or non-volatile) computer-system storage media. In an embodiment, the system memory 502 may further include a storage system 506. The storage system 506 may be configured to read and write a non-removable and non-volatile magnetic medium (which is not shown in FIG. 3, and is commonly referred to as a "hard disk driver"). Although not shown in FIG. 3, the system memory 502 may further include a magnetic disk driver for reading and writing a removable non-volatile disk (such as a floppy disk), and an optical disk driver for reading and writing a removable and non-volatile optical disk (such as a CD-ROM, a DVD-ROM, or other optical media). In such cases, each driver may be connected to the bus 503 via one or more data medium interfaces. The system memory 502 may include at least one program product, where the program product includes at least one program module 507 configured to perform multiple functions in embodiments of the present disclosure.

A program/utility 508 including at least one program module 507 may be stored in, for example, the system memory 502. The program module 507 may include but is not limited to: an operation system, one or more applications, another program module, and program data. In addition, each or a combination of the examples may include an implementation of a network environment. Generally, the program module 507 performs the functions and/or the methods according to embodiments described herein, so that at least one of the multiple wind turbines executes the yaw control strategy determined for the wind turbine.

The field-group control device 50 may communicate with a display 60 and one or more other external devices 70 (such as a keyboard and a pointing device), and may communicate with one or more devices that enable a user to interact with the field-group control device 50 and/or any device (such as a network card or a modem) that enables the field-group control device 50 to communicate with one or more other computing devices. Such communication may be performed via an input/output (I/O) interface 509. In addition, the field-group control device 50 may communicate with one or more networks (such as a local area network (LAN), a wide area network (WAN), and/or a public network (for example, the Internet)) via a network adapter 510. As shown in FIG. 3, the network adapter 510 may communicate with another module of the field-group control device 50 via the bus 503. It should be understood that although not shown in FIG. 3, another hardware module and/or another software module may be used in conjunction with the computer system. The hardware and/or the software module may include but are not limited to: a microcode, a device driver, a redundant processing unit, an external disk drive array, a RAID system, a tape driver, or a data backup storage system.

It should be noted that FIG. 3 illustratively shows a schematic diagram of a field-group control device 50 that may be configured to implement the various embodiments of the present disclosure. Those skilled in the art should understand that the field-group control device 50 may be implemented by a conventional control device in a current control system for a wind turbine, or may be implemented by an additional control device that is introduced. Alternatively, the field-group control device 50 may be implemented by a conventional control device in a current control system for the wind turbine and an additional device together.

Further, a computer readable storage medium storing a computer program is provided according to an embodiment of the present disclosure. The computer program may include instructions for performing various operations in the aforementioned method for controlling yaw of the wind turbine.

Further, a device for controlling yaw of a wind turbine is provided according to the present disclosure. The device for controlling yaw of a wind turbine includes a computer readable storage medium storing a computer program. The computer program includes instructions for performing various operations in the aforementioned method for controlling yaw of the wind turbine.

Although some embodiments of the present disclosure are illustrated and described, those skilled in the art should understand that various modifications may be made to the embodiments without departing from the spirit and the scope of the present disclosure as defined in the appended claims and equivalents of the claims.

The invention claimed is:

1. A method for controlling yaw of a wind turbine, comprising:
    acquiring an ambient wind speed and a deviation angle of wind alignment, of the wind turbine, wherein the ambient wind speed and the deviation angle of wind alignment are a current ambient wind speed and a current deviation angle of wind alignment, or a future ambient wind speed and a future deviation angle of wind alignment;
    estimating a power variation caused by a yawing operation for wind alignment, wherein the yawing operation for wind alignment is performed by the wind turbine based on the deviation angle of wind alignment under the ambient wind speed;
    determining a yaw control strategy for the wind turbine based on the estimated power variation; and
    sending an instruction to the wind turbine to make the wind turbine execute the determined yaw control strategy;
    wherein estimating the power variation caused by the yawing operation for wind alignment comprises: estimating at least one of an output power increment or a power loss, caused by the yawing operation for wind alignment that is performed by the wind turbine based on the deviation angle of wind alignment under the ambient wind speed;
    wherein determining the yaw control strategy for the wind turbine comprises: determining at least one of a time delay constant for yawing or a time coefficient for calculating a mean deviation angle of wind alignment, for controlling yaw of the wind turbine, based on the estimated at least one of the output power increment or the estimated power loss, and wherein: the time coefficient for calculating a mean deviation angle of wind alignment represents a length of a period, within which deviation angles of wind alignment for calculating the mean deviation angle of wind alignment are acquired; and the time delay constant for yawing represents a time difference between a moment at which it is determined that the yawing operation for wind alignment is to be performed and a moment at which the yawing operation for wind alignment is actually started.

2. The method for controlling yaw according to claim 1, wherein acquiring the ambient wind speed and the deviation angle, of the wind alignment, comprises at least one of:
    acquiring the current ambient wind speed of the wind turbine and the current deviation angle of wind alignment of the wind turbine that are detected; or
    acquiring the future ambient wind speed of the wind turbine and the future deviation angle of wind alignment of the wind turbine that are predicted.

3. The method for controlling yaw according to claim 2, wherein acquiring the future ambient wind speed of the wind turbine and the future deviation angle of wind alignment of the wind turbine that are predicted comprises:
    inputting first operation data of the wind turbine into a wind speed prediction model corresponding to the wind turbine, to predict the future ambient wind speed through the wind speed prediction model, wherein the first operation data comprises at least a history ambient wind speed; and
    inputting second operation data of the wind turbine into a wind-alignment deviation-angle prediction model corresponding to the wind turbine, to estimate the future deviation angle of wind alignment through the wind-alignment deviation-angle prediction model, wherein the second operation data comprises at least a history deviation angle of wind alignment.

4. The method for controlling yaw according to claim 3, wherein:
    the first operation data further comprises at least one of: a rotation speed of a power generator, a torque of a power generator, an output power, an acceleration of a nacelle, a pitch angle of a blade, of a position of a nacelle; or
    the second operation data comprises at least one of: a rotation speed of a power generator, a torque of a power generator, an output power, an acceleration of a nacelle, a pitch angle of a blade, and a position of a nacelle.

5. The method for controlling yaw according to claim 3, wherein acquiring the ambient wind speed and the deviation angle of wind alignment of the wind turbine comprises:
    acquiring the predicted future ambient wind speed and the predicted future deviation angle of wind alignment of the wind turbine, in a case that it is determined that prediction accuracy of the wind speed prediction model and prediction accuracy of the wind-alignment deviation-angle prediction model meet a preset condition; and acquiring the detected current ambient wind speed and the detected current deviation angle of wind alignment of the wind turbine, in a cased that it is determined that the prediction accuracy of the wind speed prediction model and the prediction accuracy of the wind-alignment deviation-angle prediction model does not meet the preset condition.

6. The method for controlling yaw according to claim 1, wherein determining the yaw control strategy for the wind turbine further comprises:

determining, based on the estimated at least one of the output power increment or the estimated power loss, the yaw control strategy for the wind turbine as one of a first mode, a second mode, and a third mode, wherein at least one of: the time coefficient for calculating the mean deviation angle of wind alignment is equal to a first preset value in the first mode, the time coefficient for calculating the mean deviation angle of wind alignment is equal to a third preset value in the second mode, and the time coefficient for calculating the mean deviation angle of wind alignment is equal to a fifth preset value in a third mode, wherein the first preset value is greater than the fifth preset value, and the fifth preset value is greater than the third preset value; or the time delay constant for yawing is equal to a second preset value in the first mode, the time delay constant for yawing is equal to a fourth preset value in the second mode, and the time delay constant for yawing is equal to a sixth preset value in the third mode, wherein the second preset value is greater than the sixth preset value, and the sixth preset value is greater than the fourth preset value.

7. The method for controlling yaw according to claim 5, wherein determining the yaw control strategy for the wind turbine further comprises at least one of:

determining the yaw control strategy for the wind turbine as the first mode in case of $\Delta P(v) \leq P_{loss}$;

determining the yaw control strategy for the wind turbine as the second mode in case of $P_{loss} < \Delta P(v) \leq P_e(v)$; or determining the yaw control strategy for the wind turbine as the third mode in case of $P(v) \geq P_e(v) + P_{const1}$; and wherein $\Delta P(v)$ represents an output power increment caused by performing the yawing operation for wind alignment, $P_{loss}$ represents a power loss caused by performing the yawing operation for wind alignment, $P(v)$ represents an output power of the wind turbine under the acquired ambient wind speed, $P_e(v)$ represents a designed output power of the wind turbine under the acquired ambient wind speed in a standard condition, and $P_{const1}$ represents a preset margin.

8. A computer readable storage medium, storing a computer program, wherein the computer program when executed by a processor implements the method for controlling yaw of a wind turbine according to claim 1.

9. A system for controlling yaw of a wind turbine, comprising:

a plurality of wind turbines; and a field-group control device, configured to perform the method for controlling yaw of a wind turbine according to claim 1, to make at least one of the plurality of wind turbines to perform the corresponding yaw control strategy.

10. A device for controlling yaw of a wind turbine, comprising:

a processor: and a memory storing a computer program, wherein the computer program when executed by the processor configures the device to:

acquire an ambient wind speed and a deviation angle of wind alignment, of the wind turbine, wherein the ambient wind speed and the deviation angle of wind alignment are a current ambient wind speed and a current deviation angle of wind alignment, or a future ambient wind speed and a future deviation angle of wind alignment;

estimate a power variation caused by a yawing operation for wind alignment, wherein the yawing operation for wind alignment is performed by the wind turbine based on the deviation angle of wind alignment under the ambient wind speed;

determine a yaw control strategy for the wind turbine based on the estimated power variation; and send an instruction to the wind turbine to make the wind turbine execute the determined yaw control strategy;

wherein the computer program when executed by the processor configures the device to: estimate at least one of an output power increment or a power loss, caused by the yawing operation for wind alignment that is performed by the wind turbine based on the deviation angle of wind alignment under the ambient wind speed;

wherein the computer program when executed by the processor configures the device to: determine at least one of a time delay constant for yawing or time coefficient for calculating a mean deviation angle of wind alignment, for controlling yaw of the wind turbine, based on the estimated at least one of the output power increment or the estimated power loss; the time coefficient for calculating a mean deviation angle of wind alignment represents a length of a period, within which deviation angles of wind alignment for calculating the mean deviation angle of wind alignment are acquired; and the time delay constant for yawing represents a time difference between a moment at which it is determined that the yawing operation for wind alignment is to be performed and a moment at which the yawing operation for wind alignment is actually started.

11. The device for controlling yaw according to claim 10, wherein the computer program when executed by the processor configures the device to at least one of:

acquire the current ambient wind speed of the wind turbine and the current deviation angle of wind alignment of the wind turbine that are detected; or acquire the future ambient wind speed of the wind turbine and the future deviation angle of wind alignment of the wind turbine that are predicted.

12. The device for controlling yaw according to claim 11, wherein the computer program when executed by the processor configures the device to:

input first operation data of the wind turbine into a wind speed prediction model corresponding to the wind turbine, to predict the future ambient wind speed through the wind speed prediction model, wherein the first operation data comprises at least a history ambient wind speed; and input second operation data of the wind turbine into a wind-alignment deviation-angle prediction model corresponding to the wind turbine, to estimate the future deviation angle of wind alignment through the wind-alignment deviation-angle prediction model, wherein the second operation data comprises at least a history deviation angle of wind alignment.

13. The device for controlling yaw according to claim 12, wherein:
the first operation data further comprises at least one of: a rotation speed of a power generator, a torque of a power generator, an output power, an acceleration of a nacelle, a pitch angle of a blade, of a position of a nacelle; or
the second operation data comprises at least one of: a rotation speed of a power generator, a torque of a power generator, an output power, an acceleration of a nacelle, a pitch angle of a blade, and a position of a nacelle.

14. The device for controlling yaw according to claim 12, wherein the computer program when executed by the processor configures the device to:
acquire the predicted future ambient wind speed and the predicted future deviation angle of wind alignment of the wind turbine, in a case that it is determined that prediction accuracy of the wind speed prediction model and prediction accuracy of the wind-alignment deviation-angle prediction model meet a preset condition; and
acquire the detected current ambient wind speed and the detected current deviation angle of wind alignment of the wind turbine, in a cased that it is determined that the prediction accuracy of the wind speed prediction model and the prediction accuracy of the wind-alignment deviation-angle prediction model does not meet the preset condition.

15. The device for controlling yaw according to claim 10, wherein the computer program when executed by the processor configures the device to:
determine, based on the estimated at least one of the output power increment or the estimated power loss, the yaw control strategy for the wind turbine as one of a first mode, a second mode, and a third mode,
wherein at least one of: the time coefficient for calculating the mean deviation angle of wind alignment is equal to a first preset value in the first mode, the time coefficient for calculating the mean deviation angle of wind alignment is equal to a third preset value in the second mode, and the time coefficient for calculating the mean deviation angle of wind alignment is equal to a fifth preset value in a third mode, wherein the first preset value is greater than the fifth preset value, and the fifth preset value is greater than the third preset value; or time delay constant for yawing is equal to a second preset value in the first mode, the time delay constant for yawing is equal to a fourth preset value in the second mode, and the time delay constant for yawing is equal to a sixth preset value in the third mode, wherein the second preset value is greater than the sixth preset value, and the sixth preset value is greater than the fourth preset value.

16. The device for controlling yaw according to claim 15, wherein the computer program when executed by the processor configures the device to at least one of:
determine the yaw control strategy for the wind turbine as the first mode in case of $\Delta P(v) \leq P_{loss}$;
determine the yaw control strategy for the wind turbine as the second mode in case of $P_{loss} < \Delta P(v) \leq P_e(v)$; or
determine the yaw control strategy for the wind turbine as the third mode in case of $P(v) \geq P_e(v) + P_{const1}$; and
wherein $\Delta P(v)$ represents an output power increment caused by performing the yawing operation for wind alignment, $P_{loss}$, represents a power loss caused by performing the yawing operation for wind alignment, $P(v)$ represents an output power of the wind turbine under the acquired ambient wind speed, $P_e(v)$ represents a designed output power of the wind turbine under the acquired ambient wind speed in a standard condition, and $P_{const1}$ represents a preset margin.

* * * * *